July 5, 1932.　　　J. E. LOVELY　　　1,865,527
MACHINE TOOL
Filed Aug. 22, 1929　　　6 Sheets-Sheet 3
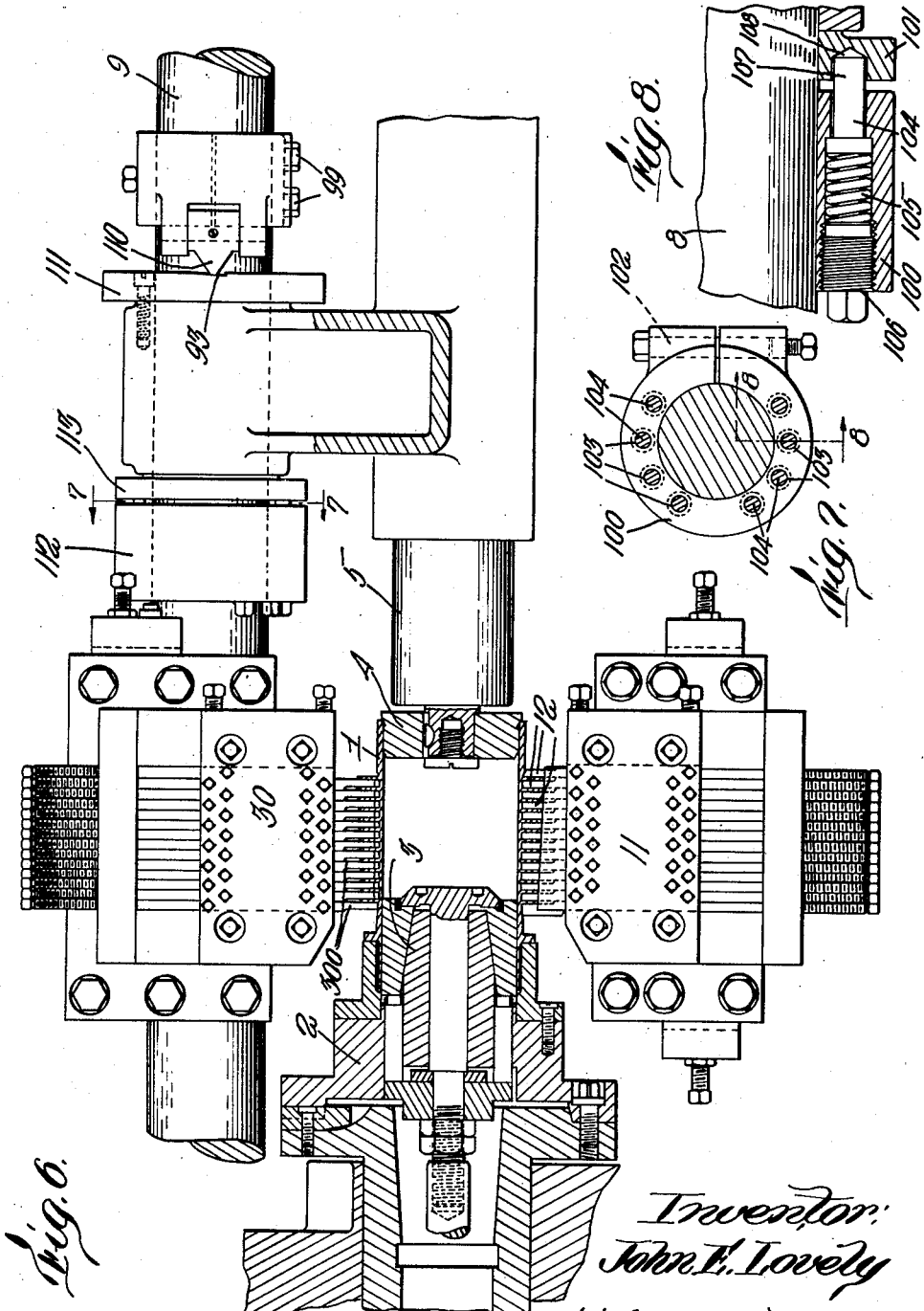
Inventor:
John E. Lovely
by Wright Brown Quinby May
Attys.

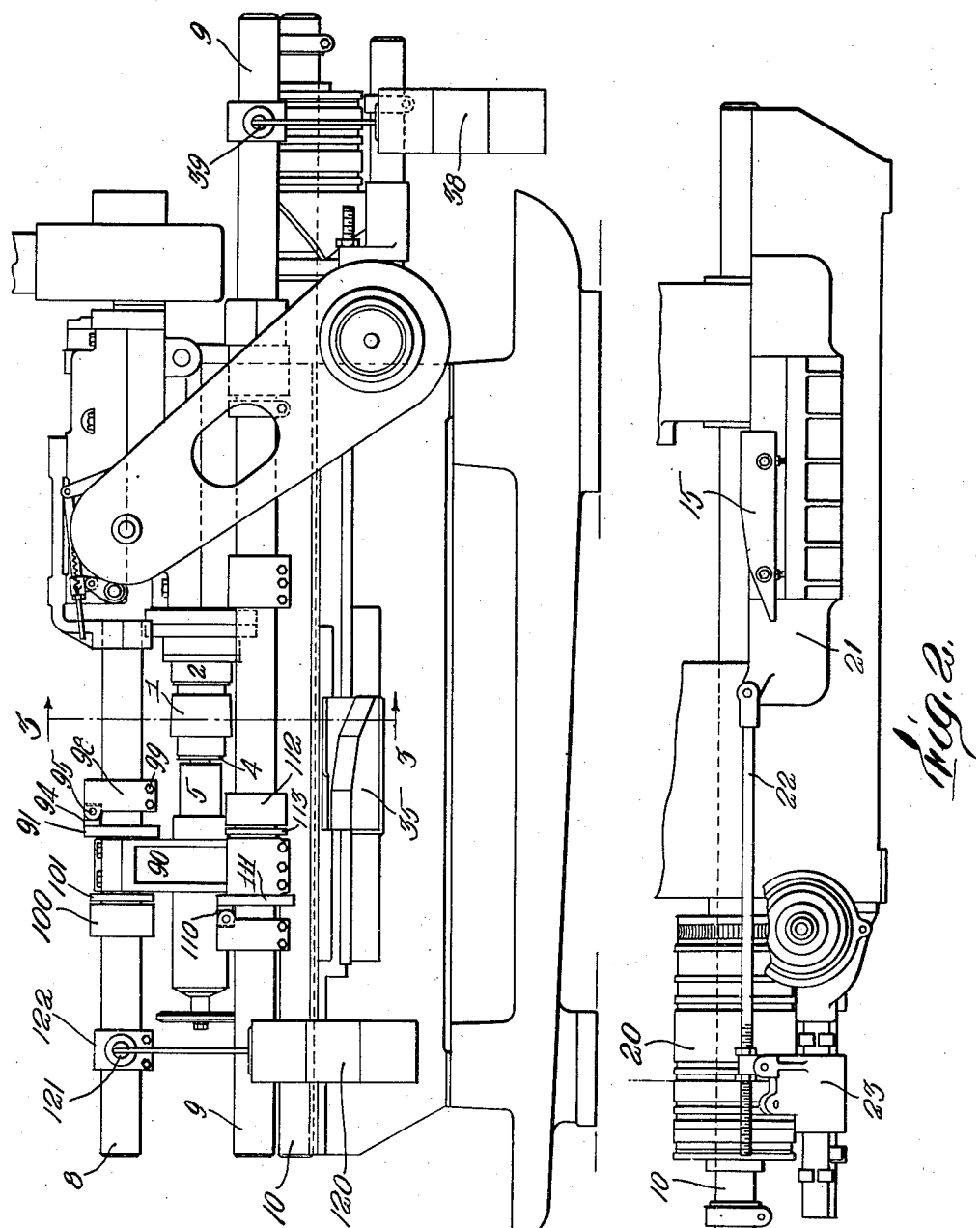

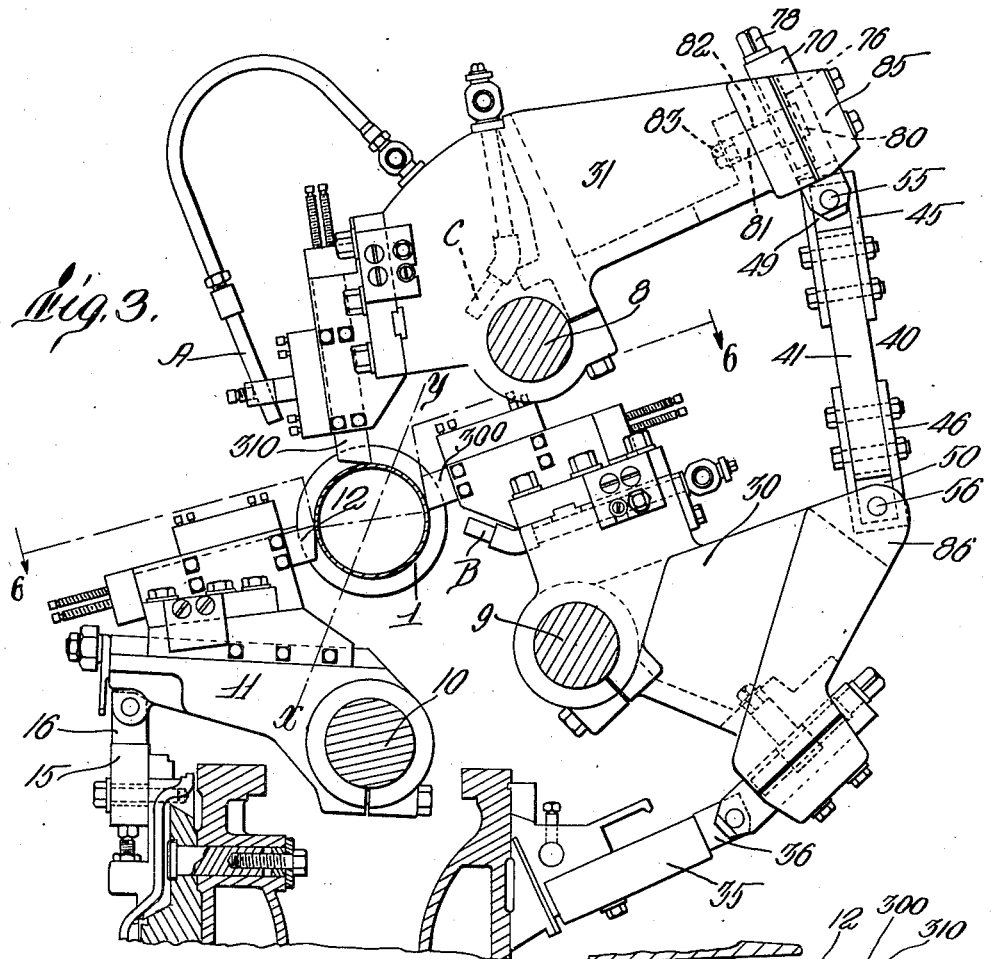

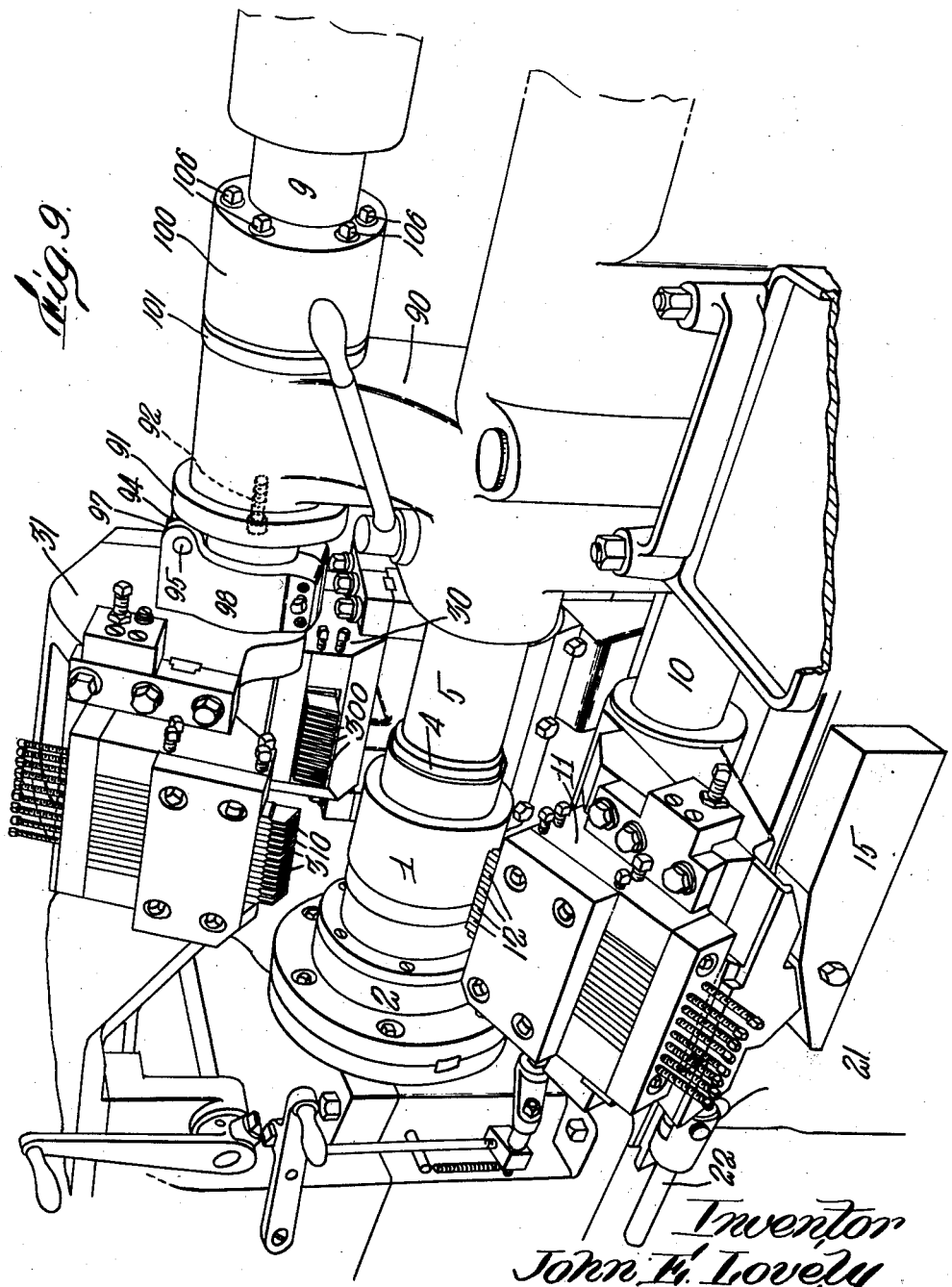

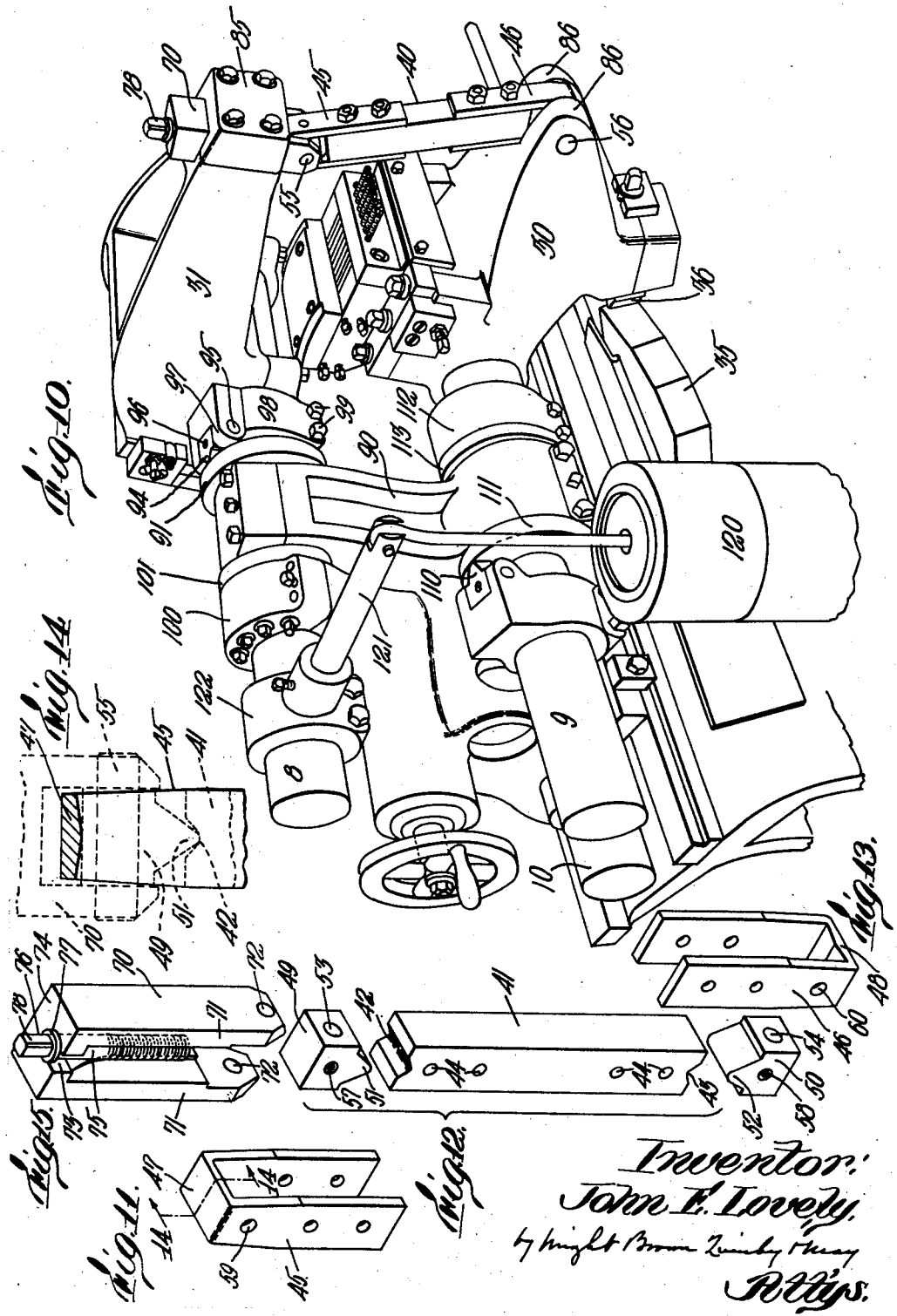

July 5, 1932. J. E. LOVELY 1,865,527
MACHINE TOOL
Filed Aug. 22, 1929 6 Sheets-Sheet 6
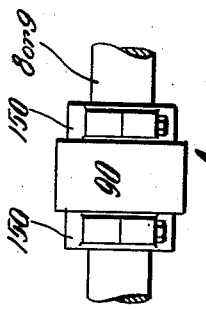
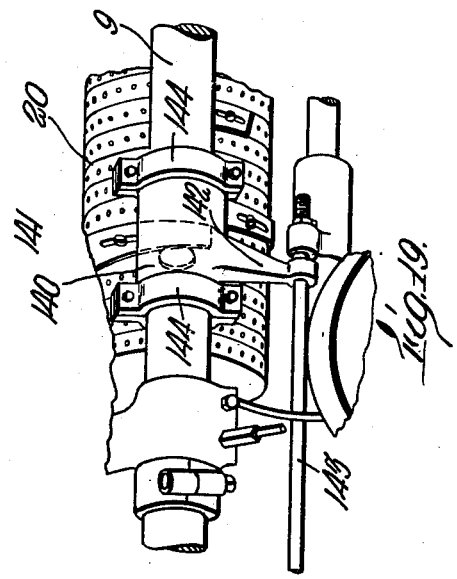
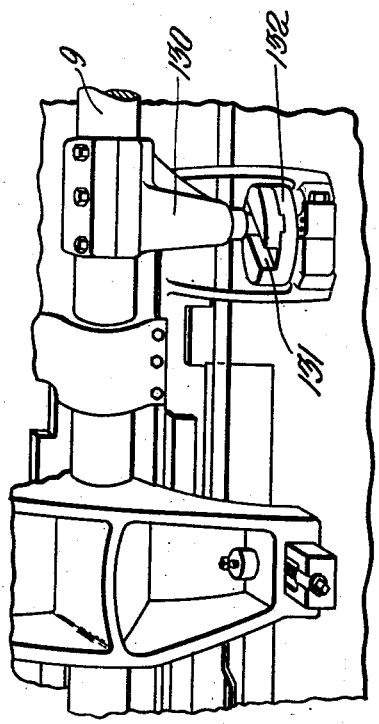
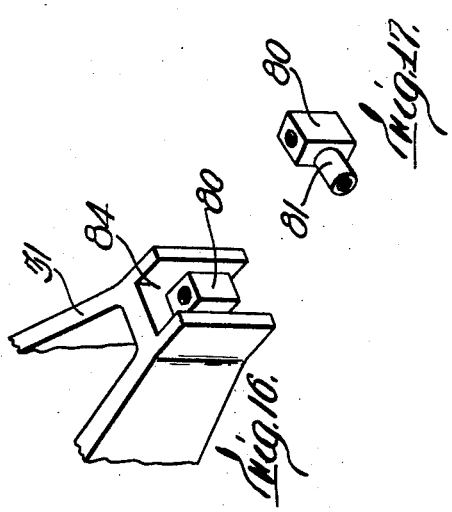
Inventor
John E. Lovely Patented July 5, 1932

1,865,527

UNITED STATES PATENT OFFICE

JOHN E. LOVELY, OF SPRINGFIELD, VERMONT, ASSIGNOR TO JONES & LAMSON MACHINE COMPANY, OF SPRINGFIELD, VERMONT, A CORPORATION OF VERMONT

MACHINE TOOL

Application filed August 22, 1929. Serial No. 387,694.

This invention relates to machine tools, more especially to those designed to take a plurality of cuts simultaneously and has for one object to provide for taking three sets of independently controlled simultaneous cuts. While not restricted to such use, it has been more particularly developed to meet the requirements incident to rapid machining of the cooling fins on engine cylinders of a type commonly used on air craft, and for the purpose of illustration it will be described particularly with reference to this service, but not by way of limitation thereto except as may be specifically stated. Such cylinders are usually made from solid forgings machined to form, this machining producing on the outside of the cylinder circumferentially arranged fins for the purpose of increasing the heat radiating surface. The operation of cutting these fins is termed the "finning" operation and is an operation for which the present invention is particularly suitable. The fins are usually made so that they are thicker at their root diameter than at their outer edges. The three sets of tools, therefore, may be arranged so that one cuts directly radially, thus forming the fins with a roughing cut of equal thickness throughout, the other two sets of tools being arranged to finish to tapered contour on opposite sides of the fins, being moved axially in opposite directions as they move inwardly toward the work axis. These two finishing sets of cutters may also finish form the root diameter of the cylinder between the fins and a radius or chamfer between the faces of the fins and the root diameter between the fins.

Mechanism by which certain of the axial movements are produced is also one of the features of this invention.

For a more complete understanding of this invention, reference may be had to the accompanying drawings in which Figure 1 is a somewhat diagrammatic rear elevation of the lathe of the well known Fay type embodying the subject matter of the present invention, certain portions of the lathe being omitted.

Figure 2 is a fragmentary plan of the forward portion of the same.

Figure 3 is a transverse section through the machine on about the line 3—3 of Figure 1.

Figures 4 and 5 are side elevations partly in section of the cylinder before and after the finning operation, respectively.

Figure 5a is a diagrammatic view illustrating the work of the tools on the several carriers.

Figure 6 is a fragmentary horizontal section through the machine on line 6—6 of Figure 3.

Figure 7 is a detail section on line 7—7 of Figure 6.

Figure 8 is a detail section on line 8—8 of Figure 7 to a larger scale.

Figures 9 and 10 are fragmentary perspectives showing the front and rear portions, respectively, of the machine.

Figures 11 to 13 are perspectives of parts of a connecting link shown disassembled.

Figure 14 is a cross section on line 14—14 of Figure 11 and showing certain related members in dotted lines.

Figure 15 is a perspective of the upper connecting member for the link shown in Figures 11 to 13.

Figure 16 is a fragmentary perspective of a tool carrier control arm showing the parts cooperating with the connecting member of Figure 15.

Figure 17 is a perspective of an adjusting block.

Figures 18 and 19 are fragmentary perspectives showing modifications in the mechanism for controlling the axial position of one of the tool carriers.

Figure 20 is a side elevation of one of the tool carrier shafts showing a modification.

Referring first to Figures 3, 6 and 9, it will be seen that the cylinder to be finned is supported at 1 on a work spindle indicated generally at 2. As shown in Figure 6, this work spindle is provided with some form of expanding chuck member 3 engaging its inner face at one end while the opposite end is supported by a suitable plug guide 4 carried by the tailstock 5 of the machine. Arranged angularly spaced about the work spindle are shown three oscillatable and axially movable tool shafts 8, 9 and 10, each of which has a tool carrier fixed thereto for supporting tools operating simultaneously on the work. To this end the three tool shafts are all positioned on one side of a plane x—y passing through a diametrical axis of the work so that when the tool carriers are swung away sufficient room for inserting and removing work at a position convenient to the operator is provided, while the tools when they are in position to engage the work are spaced about its periphery so that certain of them engage the work on the opposite side of that plane. The top shaft is positioned above the horizontal plane of the work spindle axis. These tool carriers must be so arranged that there is ample chip space between successive tools on each of the three bars or shafts as well as to permit streams of coolant to be flowed onto the tools on the carriers 11, 30 and 31 as through the pipes A, B and C, respectively, shown in Figure 3.

The lower shaft 10 has fixed thereto the forward tool carrier 11 arranged to carry a plurality of tools 12, each formed to cut inwardly axially of the cylinder to form the space between adjacent fins. These tools are mounted in a series extending axially of the work so that all the tools of one holder operate simultaneously thereon.

As illustrated in Figure 5a the forward tools 12 are designed to form the roughing finning operation by which the fins are cut with uniform thickness from their roots to their peripheries and for this purpose this tool carrier is arranged to be moved inwardly from the periphery of the work to the depth desired for the width of the fins. This movement of the front tool carrier may be produced by the action of a suitable wedge faced former templet 15 against the upper face of which a shoe 16 carried by the arm 11 engages, this former templet or cam being traversed beneath the tool holder 11 by any suitable means, such for example, by a cam carried by the cam drum 20 employed on this type of lathe for actuating various mechanisms. As shown in Figure 2 the former cam is adjustably carried on a traversing carriage 21, which is connected through a pull rod 22 to the cam follower slide 23 which has a cam follower of any suitable description positioned for actuation by the cams on the drum 20. For this machining operation it will be noted that there is no axial movement of the front tool carrier.

The shafts 8 and 9 have fixed thereto the back tool carrier 30 and a top tool carrier 31, respectively. Each of these carriers 30 and 31 support a plurality of finishing tools 300 and 310, respectively, which are designed to finish the side faces of the fins as they are first formed by the front cutters, one of these cutters being arranged to finish one side of each fin and the other arranged to finish the opposite side, and profile them to tapered form as shown in Figure 5a. For this reason not only must these latter tool carriers be rocked to bring the tools toward and from the axis of the work, but they must also be moved axially of the work, this requiring not only that these tool carriers be rocked but that they shall also be given motion axially of their supporting bars or shafts 8 and 9.

The rocking motion of the rear tool carrier 30 may be produced by the axial motion of a former cam as shown at 35 and against which a suitable shoe 36 carried by the outer lower end of the tool carrier 30 rides. The shoe may be kept in contact with the former cam 35 by suitable weights shown at 38 in Figure 1 suspended from the outer end of an arm 39 carried by the tool bar 9. The rocking motion of the top tool carrier 31 is shown as produced by the rocking motion of the back tool carrier 30 and for this purpose these carriers are shown as connected together by means including a link 40. As, however, the top and back tool carriers must be permitted movement axially of their supporting bars as well as a rocking or oscillatory motion, the connecting link 40 must be so made as to permit such motion and to this end it is preferably provided with a pair of joints each of which has a limited universal movement.

The construction of this link is shown in detail in Figures 11 to 13. It comprises a central bar portion 41 having at each end a transverse groove as at 42 and 43. Inwardly of these grooves the bar is provided with a plurality of holes 44 for the reception of bolts for securing thereto upper and lower U shaped strap members 45 and 46, the closed ends of which, as at 47 and 48, are spaced sufficiently from the ends of the bar 41 to receive upper and lower rocking blocks 49 and 50. Each of these blocks has a V shaped projection as 51 and 52, respectively, at a more acute angle than the grooves 42 and 43 and which engage therein with capability of relative rocking in a direction transverse to the directions of length of the grooves and projections. The inner faces of the closed ends 47 and 48 are also beveled outwardly in opposite directions so as to permit this rocking motion and yet hold the blocks without play longitudinally of the link. Each of these blocks is perforated at right angles to the length of its projection 51 or 52 as at 53 and 54 for the reception of a pivot pin as at 55 and 56. Each of these pivot pins is arranged to be fixed in its respective block as by means of a set screw inserted in a threaded opening 57 and 58 and in order to obtain access to this set screw the corresponding side face of the straps 45 and 46 may have a perforation as at 59 and 60, respectively, therethrough. The pivot 55 which passes through the upper block connects the upper end of the link to an adjusting piece 70 having opposed jaws 71 perforated at their lower ends as at 72 to receive the pivot 55. This piece has a slot 73 through its upper closed end 74 and has journaled therein a reduced diameter portion 75 of an adjusting bolt 76, this bolt having a thrust collar 77 overlying the top of the piece 74 and a polygonal end 78 to receive a wrench by which it may be turned. The lower portion of the bolt 76 is threaded through a block 80 (see Figures 3, 16 and 17), this block having a cylindrical internally threaded shank 81 which passes through a perforation 82 in an upstanding web at the rear end of the tool carrier 31. A bolt 83 threaded into the rear end of this shank portion and bearing against the rear face of the web acts to clamp this block 80 to the tool carrier, so that rotation of the bolt 76 causes longitudinal movement of the piece 70 relative to this tool carrier. This piece slides in a slot 84 in the tool carrier 31 and a cap plate 85 bolted to the tool carrier closes over the outer portion of the piece 70.

The lower block 50 is pivoted by the pivot 56 between a pair of spaced jaws 86 at the rear upper end of the back tool carrier 30. The bearing of the blocks 49 and 50 against the ends of the bar 41 produces an effective thrust connection which insures accuracy of movement of the top tool carrier feeding into the work in accordance with the similar feed of the back tool carrier 30, and the rocking mounting of these blocks permits these carriers to be moved relatively axially of the work. This axial movement may be controlled by the rocking movement. This axial movement of the top tool carrier is produced by the following mechanism. At 90 is shown a fixed bearing member through the upper end of which the top tool carrier 8 is slidably journaled. Bearing against one face of this member 90 is a cam member 91 in the form of a ring which may be fixed to the bearing member 90 as by means of a screw 92 (see Figure 9). The outer face of this ring member is provided with a sloping cam surface 93 (see Figure 6) against which bears a follower shoe 94 pivoted on a pin 95 made fast thereto as by a set screw 96 between jaws 97 of a collar 98 which is shown as split and clamped to the shaft 8 by means of the bolts 99.

Means are provided for yieldably holding the shaft 8 in such endwise position that the shoe 94 firmly engages the cam face 93. As shown this means comprises a pair of ring members 100 and 101. The ring member 100 is shown as a split ring having clamping bolts 102 by which it may be drawn together in clamping engagement with the shaft 8. Within this ring member are a plurality of sockets 103 extending parallel to the axis of the shaft 8 and within each of which is positioned a headed pin 104 (see Figure 8) back of which is positioned a coil spring 105 within the socket, the outer end of which is closed as by means of a screw plug 106. The spring 105 acts to press the pin 104 in a direction to project its end 107 into a socket 108 in the ring member 101 so as to press this ring member 101 against the opposite end of the bearing face of the member 90. The ring 101, therefore, acts as a fixed abutment against which the spring pins act, which tend to push the shaft 8 to the right as shown in Figure 9, thus to hold the shoe 94 against the cam face 93. It will be seen, therefore, that as the top tool carrier 31 is rocked to bring the tools carried thereby toward and from the axis of the work, the cam mechanism causes the tools to move axially of the work in one direction, thus to finish one face of each fin with a slightly sloping contour so that the fins are thinner at their peripheries than at their roots.

The back tool carrier may be moved axially of the work in the opposite direction by similar mechanism, the cam shoe for this purpose being shown at 110, the cam face ring at 111, the spring plunger carrying ring at 112 and its abutment ring at 113. It will be noted that the cam members 110 and 111 are positioned on the opposite side of the fixed bearing member 90 from the similar parts on the upper shaft 8, the motion axially of the two tool carriers being thus opposite to each other. The top tool carrier is normally pressed away from the work to apply compression to the connecting link and as shown this is done by the weights 120 hung from an arm 121 extending from a collar 122 clamped to the shaft 8, as best illustrated in Figures 1 and 10.

Instead of producing the desired axial movement of the back tool carrier by cam elements similar to that for the top tool carrier, it may be produced in other ways. For example, in Figure 18 this motion is shown as produced by means of an arm 130 clamped to the shaft 9 and having a follower riding within a slot 131 of a cam member 132 angularly adjustable on a portion of the machine frame. As the rear tool carrier 30 is rocked this cam follower will be caused to traverse the slot 131 and will therefore be given a motion axially of the shaft 9 depending in amount on the angular adjustment of the cam 132.

Another means of producing this axial motion of the back tool carrier is illustrated in Figure 19 in which the shaft 9 loosely carries a cam follower member 140 deriving motion axially of the shaft 9 by suitable cams 141 (one of which is shown) on the cam drum 20 with which machines of this type are commonly provided. As shown this cam follower is held from rocking motion with the shaft 9 by means of a guide portion 142 slidably on a stationary guide rod 143. A pair of collars 144 clamped to the shaft 9 at each end of the cam member 140 act to cause axial movement of this cam follower to produce a similar motion of the shaft 9. Should it be desired to form the fins of uniform thickness, no axial motion of the finishing tool carriers would be produced. The cam rings 101 and 111 would then be provided with flat faces or plane stop collars 150 (see Figure 20) might be substituted therefor.

Certain embodiment of this invention having thus been described, it should be evident to those skilled in the art that various changes and modifications might be made therein without departing from its spirit or scope as defined by the appended claims.

I claim:

1. In a machine of the class described, means for supporting work, a pair of tool carriers, means for supporting said tool carriers with capability of rocking toward and from the work, and movement axially of the work, means for rocking one of said carriers, means for causing rocking of said carrier to move said carrier axially of its rocking axis, and connections between said carriers for causing rocking of said one carrier to produce rocking of the other carrier.

2. In a machine of the class described, means for supporting work, a pair of tool carriers, means for supporting said tool carriers with capability of rocking toward and from the work, and movement axially of the work, means for rocking one of said carriers, means for causing rocking of said carrier to move said carrier axially of its rocking axis, and connections between said carriers for causing rocking of said one carrier to produce rocking of the other carrier, said connections including universal joints to permit said carriers to be moved relatively in opposite directions axially of the work.

3. In a machine of the class described, a work holder, three tool carriers, means for supporting each of said carriers for movement toward and from the work and certain of said carriers axially of the work, means for independently controlling the motions toward and from the work of two of said carriers, means for controlling the motion toward and from the work of the third carrier from the motion from and toward the work of one of the other two carriers, and means for moving certain of said carriers axially of the work.

4. In a machine of the class described, a work holder, three tool carriers, means for supporting each of said carriers for movement toward and from the work and certain of said carriers axially of the work, means for independently controlling the motions toward and from the work of two of said carriers, means for controlling the motion toward and from the work of the third carrier from the motion from and toward the work of one of the other two carriers, and means actuated by their motion toward and from the work for moving certain of said carriers axially of the work.

5. In a machine of the class described, means for supporting work, three shafts arranged about the work substantially parallel to the axis thereof, one above and at one side of the work, one below the work, and one on the same side of the work as said shaft above the work, means for supporting said shafts for oscillation about their axes and certain for axial motion, a tool carrier on each shaft and movable toward and from the work axis by the oscillation of its respective shaft, and means for controlling the oscillations and axial positions of said shafts.

6. In a machine of the class described, means for supporting work, three shafts arranged about the work substantially parallel to the axis thereof, means for supporting said shafts for oscillation about their axes and certain for axial motion, a tool carrier on each shaft and movable toward and from the work axis by the oscillation of its respective shaft, and means for controlling the oscillation and axial position of said shafts including cams for controlling the axial position of certain of said shafts from their angular position of oscillation.

7. In a machine of the class described, a work spindle, three pivotally mounted tool carriers, and tools on said carriers positioned for simultaneous operation on work carried by said spindle, the pivots for said tool carriers being positioned all on one side of a diametrical plane of said work spindle and one above the horizontal plane of the work axis, and certain of said tools being positioned to engage the work on the opposite side of said plane.

8. In a machine of the class described, a work spindle, three oscillatable tool shafts arranged substantially parallel to said work spindle and all positioned on one side of a diametrical plane of said work spindle and one above the horizontal plane of the work axis, and tool holders fixed to said shafts and carrying tools for operation on work carried by said spindle, certain of said tools engaging the work on the opposite side of said plane.

9. In a machine of the class described, a rockable and axially movable shaft, a tool carrier fixed to said shaft, cooperating cam elements one fixed and the other movable with said shaft, and means for rocking said shaft, said cam elements being formed to cause rocking of said shaft to move said shaft axially.

10. In a machine of the class described, a rockable and axially movable shaft, a tool carrier fixed to said shaft, a pair of cooperating cam elements one stationary and the other fixed to said carrier, and spring means for pressing said carrier toward said fixed cam elements whereby said cam elements may determine the position of said carrier axially of said shaft for different angular positions of said shaft.

11. In a machine of the class described, a tool carrier, an oscillatable and axially movable shaft supporting said carrier, a pair of rings, one of said rings being clamped about said shaft and having a plurality of sockets arranged about said shaft, a pin slidably mounted in each socket and having its outer end bearing against the other of said rings, a spring in each socket for pressing said pins outwardly to separate said rings, a stationary bearing for said shaft against one end of which the other of said rings engages, a cam member at the opposite end of said bearing, and a cam follower fixed to said shaft and held in engagement with the face of said cam by the pressure of said springs.

12. In a machine of the class described, a tool carrier, an oscillatable and axially movable shaft for supporting said carrier, a bearing for said shaft, a cam at one end of said bearing, a follower fixed to said shaft in position to engage the end face of said cam throughout the oscillation of said shaft, and means for holding said follower against said cam comprising a pair of rings one fixed to said shaft and the other engaging the opposite end of said bearing, and yielding elements for spacing said rings.

13. The method of finning engine cylinders, which comprises cutting inwardly at a plurality of spaced points to form by a roughing cut a series of spaced outwardly extending circumferentially arranged parallel faced fins, and simultaneously forming a pair of finishing cuts for each fin, feeding axially in opposite directions and inwardly to cause said fins to taper toward their outer edges.

14. In a machine of the class described, means for supporting work, three oscillatable and axially movable tool shafts arranged about the axis of the work, one above, one beneath, and one at one side of the work, a tool carrier on each shaft, a cam drum, cams on said drum, followers for said cams, operative connections from said followers for oscillating the shafts beneath and at one side of the work, cam means for controlling the axial positions of the shaft above the work and of the shaft at one side of the work in accordance with their angular positions, and link connections from said shaft above the work to one of the other of said shafts for controlling the angular position of said upper shaft in accordance with the angular position of said other shaft.

15. In a machine of the class described, means for supporting work, a pair of tool carriers, a rockable and axially movable shaft to which each carrier is secured, a cam for controlling the angular position of one of said carriers, means for controlling the axial position of its shaft, means for controlling the axial position of the other shaft in accordance with the angular position of its carrier, and a link connecting said carriers to cause their angular positions to be controlled simultaneously by said cam.

16. In a machine of the class described, means for supporting work, a pair of tool carriers, a rockable and axially movable shaft to which each carrier is secured, a cam for controlling the angular position of one of said carriers, means for controlling the axial position of its shaft, means for controlling the axial position of the other shaft in accordance with the angular position of its carrier, and a link connecting said carriers to cause their angular positions to be controlled simultaneously by said cam, said link having universal joint connections to said carriers to permit said carriers and shafts to be moved simultaneously in opposite directions.

17. In a machine of the class described, a headstock, a tailstock, a work spindle carried in said headstock, three oscillatable tool shafts arranged substantially parallel to said spindle and supported in said head and tailstocks, one of said tool shafts being arranged above the horizontal plane of said spindle, tool carriers fixed to said shafts, and means for controlling the angular positions of said shafts.

18. In a machine of the class described, a headstock, a tailstock, a work spindle carried in said headstock, three oscillatable tool shafts arranged substantially parallel to said spindle and supported in said head and tailstocks, certain of said shafts being movable axially, one of said tool shafts being arranged above the horizontal plane of said spindle, tool carriers fixed to said shafts, and means for controlling the angular positions of said shafts and the axial positions of said certain shafts.

19. In a machine of the class described, a headstock, a tailstock, a work spindle in said headstock, a plurality of tool shafts arranged about said spindle including an oscillatory and axially movable tool shaft supported in said head and tailstocks above the horizontal plane of said spindle, tool carriers fixed to said shafts, and means for controlling the axial and angular positions of said shafts.

In testimony whereof I have affixed my signature.

JOHN E. LOVELY.